United States Patent
Book et al.

(10) Patent No.: US 7,764,774 B2
(45) Date of Patent: Jul. 27, 2010

(54) ALLOW TOLL FREE CALLS VIA DEDICATED ACCESS LINE (DAL) BASED UPON ORIGINATION

(75) Inventors: Nancy Ann Book, Palatine, IL (US); Monica Cuellar, Waukesha, WI (US); Sean Reppen, West Allis, WI (US); Denis F. Nolan, Tracy, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1579 days.

(21) Appl. No.: 10/975,343

(22) Filed: Oct. 29, 2004

(65) Prior Publication Data

US 2006/0093112 A1    May 4, 2006

(51) Int. Cl.
*H04M 15/00* (2006.01)
(52) U.S. Cl. .......................... 379/114.24; 379/114.29; 379/115.01
(58) Field of Classification Search ............ 379/114.01, 379/114.24, 114.28, 114.29, 115.01, 220.01, 379/221.02, 221.09, 221.14
See application file for complete search history.

(56) References Cited

U.S. PATENT DOCUMENTS

| | | | |
|---|---|---|---|
| 5,563,933 A * | 10/1996 | August et al. .......... | 379/114.01 |
| 7,072,454 B1 * | 7/2006 | Ward ..................... | 379/114.24 |
| 2004/0213392 A1 | 10/2004 | Crockett et al. | |
| 2005/0041795 A1 * | 2/2005 | Goldstein et al. ...... | 379/221.13 |
| 2005/0044243 A1 * | 2/2005 | Narayanan et al. .......... | 709/229 |
| 2007/0253547 A1 * | 11/2007 | Sanchez et al. ........ | 379/221.09 |

OTHER PUBLICATIONS

U.S. Appl. No. 11/024,780 to Crockett et al.

\* cited by examiner

*Primary Examiner*—Quoc D Tran
(74) *Attorney, Agent, or Firm*—Greenblum & Bernstein, P.L.C.

(57) ABSTRACT

An advanced intelligent network (AIN) telephony service permits users of a dedicated access line (DAL) service to place toll free calls over the DAL, even when the long distance network cannot query a national toll free database, such as a national service management system (SMS). A switch in the long distance network, which cannot access the toll free network, receives the toll free call and forwards the toll free call to a switch that can access the national toll free database. In one embodiment, the switch that can access the national toll free database resides in a local exchange carrier (LEC) network. Thus, the DAL subscribers do not have to route toll free calls over local trunks.

17 Claims, 2 Drawing Sheets

ALLOW TOLL FREE CALLS VIA DEDICATED ACCESS LINE (DAL) BASED UPON ORIGINATION

BACKGROUND OF THE INVENTION

1. Field of the Invention

The present invention relates to the field of telecommunications. More particularly, the present invention relates to routing toll free calls placed over a dedicated access line (DAL).

2. Background Information

A dedicated access line (DAL) service provides a subscriber with a direct line to a long distance carrier's switch, bypassing the local telephone company network and reducing costs. Subscribers to a DAL service typically would like to place all of their long distance calls over the DAL in order to prevent increasing their local trunk groups to accommodate this toll free traffic.

Some long distance networks, however, do not permit DAL subscribers to dial toll free numbers over the DAL. The limitation is caused by the inability of these long distance networks to perform toll free database look ups, which are required to associate the dialed toll free number with an actual routing number. For example, networks employing the Nortel DMS 250 long distance tandem switching systems may not be configured to query a national service management system (SMS). Consequently, the DAL subscribers must place their toll free calls via the local telephone company.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which.

DETAILED DESCRIPTION OF EMBODIMENTS

Figure 1:
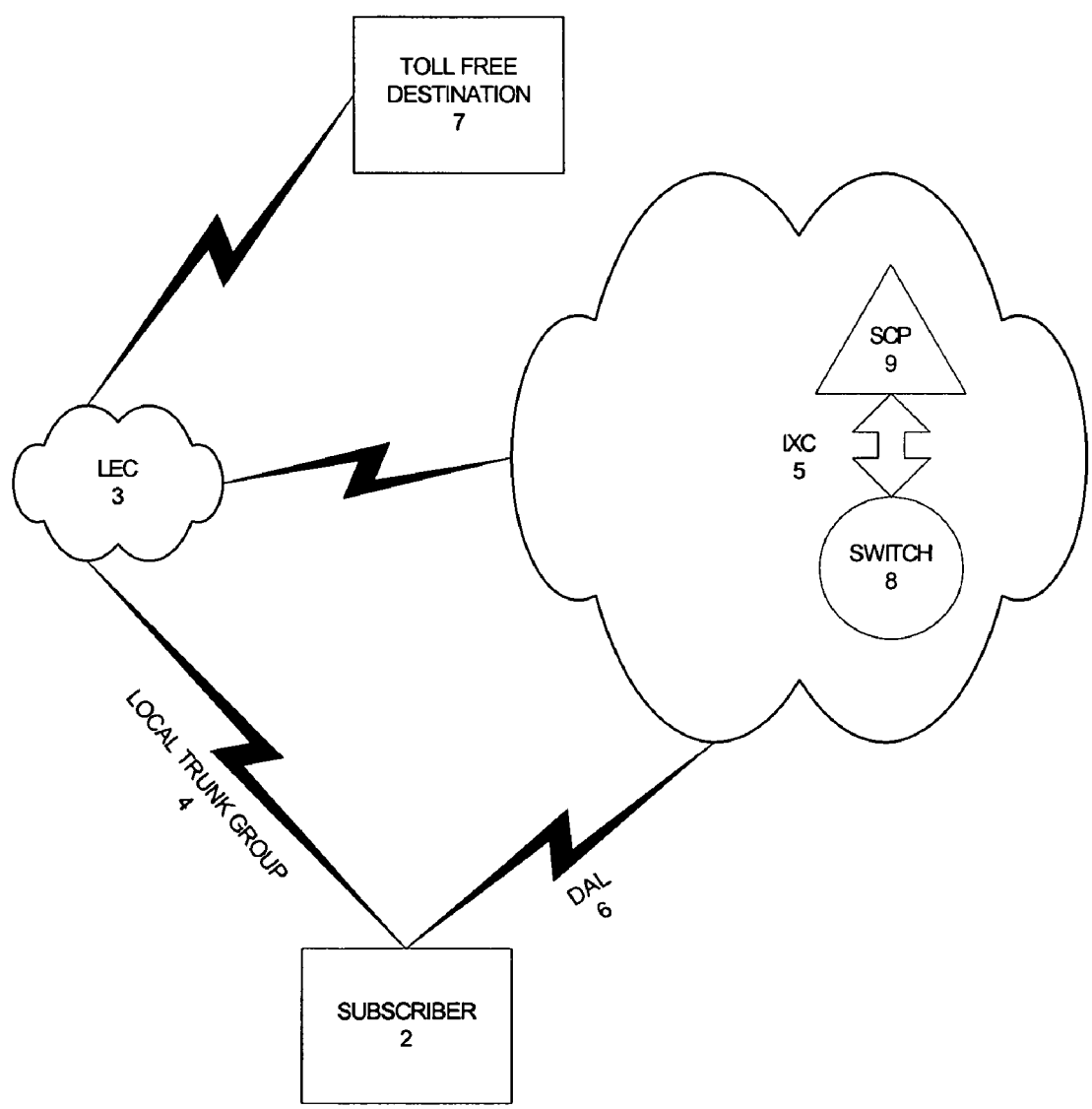
FIG. 1 is a diagram showing an exemplary environment in which an aspect of the present invention operates.

According to the present invention, DAL subscribers are able to place toll free calls over a DAL, even when the long distance network is unable to query a national SMS. The service can be an advanced intelligent network (AIN) service that routes subscriber's calls placed over the DAL to a tandem switch that can perform normal toll free processing.

In one embodiment of the present invention, a method is provided for placing a toll free call via a dedicated access line (DAL) connected to an interexchange carrier (IXC) network that cannot directly access a national toll free database. The method includes receiving the toll free call via the DAL; and routing the toll free call from the IXC network to a switch that can directly access the national toll free database.

The method may also include determining whether toll free calls are permitted over the DAL, and when toll free calls are not permitted over the DAL, terminating the toll free call. In one aspect, the method further includes mapping an identifier of the DAL to a route index, in which case the routing includes routing based upon the route index. The identifier may be a switch identifier and trunk group number of the DAL. The mapping may also include mapping the switch identifier and trunk group number of the DAL to an NPA NXX associated with the DAL and then mapping the NPA NXX associated with the DAL to the route index. In another aspect, the method further includes attempting to map an identifier of the DAL to a route index, and when the attempt fails, the routing includes routing based upon a default route index.

In another embodiment, a computer readable medium stores a program for placing a toll free call via a dedicated access line (DAL) connected to an interexchange carrier (IXC) network that cannot directly access a national toll free database. The medium includes a receiving code segment that receives the toll free call via the DAL; and a routing code segment that routes the toll free call from the IXC network to a local exchange carrier (LEC) network that processes the toll free call.

The medium may also store an access code segment that determines whether toll free calls are permitted over the DAL, and when toll free calls are not permitted over the DAL, terminating the toll free call.

The medium may also store a mapping code segment that maps an identifier of the DAL to a route index. In this case, the routing code segment routes based upon the route index. The mapping code segment can attempt to map an identifier of the DAL to a route index, and when the attempt fails, the routing code segment routes based upon a default route index. The identifier may be a switch identifier and trunk group number of the DAL. The mapping code segment can map the switch identifier and trunk group number of the DAL to an NPA NXX associated with the DAL and then map the NPA NXX associated with the DAL to the route index.

In yet another embodiment, a network places a toll free call from a subscriber. The network includes a dedicated access line (DAL) over which the subscriber places the toll free call. The network also includes an interexchange carrier (IXC) switch that cannot directly access a national toll free database, the IXC switch terminating the DAL. The network further includes a service control point (SCP) that determines whether the subscriber is permitted to place the toll free call via the DAL. When the subscriber is permitted to place the toll free call via the DAL the SCP instructs the IXC switch to route the call to a switch that can access the national toll free database.

The network may also include the switch that can access the national toll free database. In one aspect, the SCP generates instructions to terminate the toll free call when the SCP determines that the subscriber is not permitted to place toll free calls over the DAL. In another aspect, the SCP maps an identifier of the DAL to a route index, and provides routing instructions based upon the route index. The identifier can be a switch identifier and trunk group number of the DAL. In this case the SCP maps the switch identifier and trunk group number of the DAL to an NPA NXX associated with the DAL and then maps the NPA NXX associated with the DAL to the route index. The SCP can map the route index to a switch identifier and trunk group number of the switch that can access the national toll free database. In yet another aspect, the SCP attempts to map an identifier of the DAL to a route index, and when the attempt fails, the SCP provides routing instructions based upon a default route index.

Referring to FIG. 1, a subscriber 2 is connected to a local exchange carrier (LEC) network 4 via a local trunk group 4, and to an interexchange carrier (IXC) network 5 via a dedicated access line (DAL) 6. The LEC 3 communicates with a toll free destination 7 via well known communications channels. The LEC network 3 and IXC network 5 communicate via, for example, a feature group D access trunk. The IXC network 5 includes a switch 8 and a service control point 9.

Figure 2:
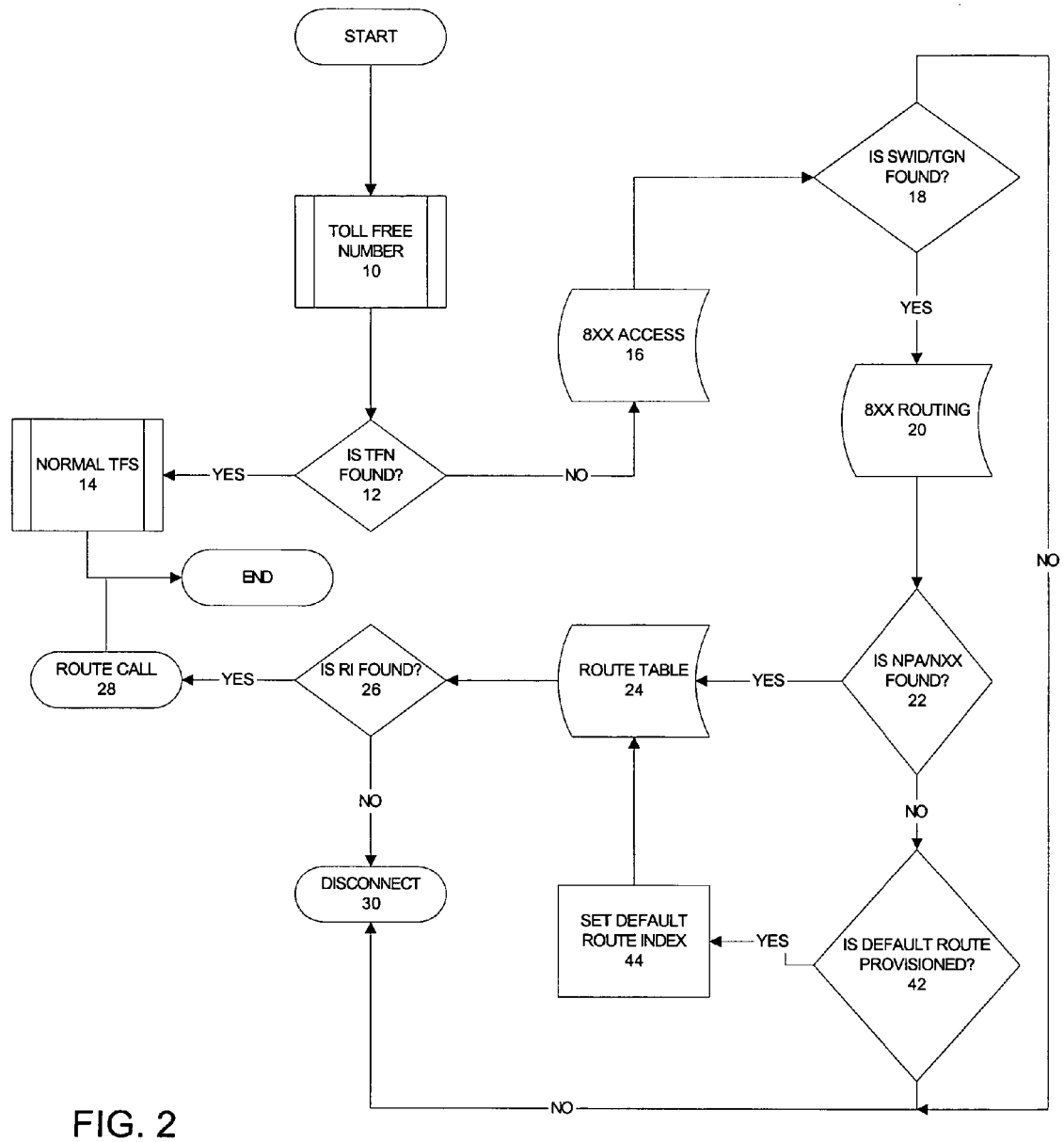
FIG. 2 is a flow diagram showing exemplary service logic, according to an aspect of the present invention.

Referring to FIG. 2, in response to a subscriber 2 placing a toll free call over the DAL 6 at step 10, the switch 8 e.g., a Nortel DMS 250, within the IXC network 5, launches a query to the service control point (SCP) 9. A trigger is set in the switch 8 that recognizes toll free numbers, such as 8XX numbers. The type of trigger is specific to the trunk group of the DAL 6.

Upon receiving the query, the SCP 9 checks its internal database to determine whether the dialed toll free number is found at step 12. If so, normal toll free service processing occurs within the IXC network 5 at step 14 and then the logic ends. Otherwise, an 8XX access table is checked at step 16. Because normally toll free calls are not permitted over the DAL 6, the 8XX access table stores a list of DAL identifiers, such as a switch identifier and trunk group number, which identify each DAL subscribed to the service, i.e., permitted to place toll free calls. An alias for each switch identifier/trunk group number can also be provided. The alias is preferably the corresponding NPA NXX. The look-up in the 8XX access database may be performed, in addition to the setting of the trigger in the switch 8, in case toll free calls are received over the DAL 6 via a call transfer service, rather than being dialed directly.

At step 18 if the switch identifier/trunk group number is not found, the subscriber is disconnected at step 30. If the switch identifier/trunk group number is found, at step 20 an 8XX routing table is searched. The 8XX routing table maps NPA NXXs (corresponding to the switch identifier/trunk group number of the DAL 6) to route indexes. Each route index indicates to which tandem switch, e.g., within the LEC network 3, the toll free call should be routed.

If, at step 22, the NPA NXX is found in the 8XX routing table, then the associated route index is looked-up in a route table at step 24 to determine an identifier, e.g., the switch identifier/trunk group number, of the destination tandem. If the route index is found at step 26, the SCP 9 provides instructions to route the call to a switch outside the IXC network 5 at step 28 and then the IXC network's processing ends.

In one embodiment, if the call was received via a call transfer service, the SCP 9 instructs an intelligent peripheral (not shown) to route the call. If the call was received via direct dial, the SCP 9 instructs the switch 8 to route the call. Once the call is routed to the switch outside the IXC network 5, normal toll free processing for the outside switch then occurs, i.e., the outside switch queries the national SMS and routes the call in a well known manner. If the route index is not found at step 26, the call is disconnected at step 30.

If the NPA NXX is not found at step 22, an error is logged and it is determined whether a default route index has been provided at step 42. If so, the default route index is obtained at step 44 and queried in the route table at step 24. The logic then proceeds as described above. If no default route is determined to be provisioned at step 42, the call is disconnected at step 30.

Thus, the present invention provides a service that enables a caller from a DAL to place toll free calls, even when the long distance network does not permit queries to a national toll free database, such as an SMS.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for public telephone networks (e.g., AIN) represents an example of the state of the art. Such standards are periodically superseded by faster or more efficient equivalents having essentially the same functions. Accordingly, replacement standards and protocols having the same functions are considered equivalents.

What is claimed is:

1. A method for placing a toll free call via a dedicated access line connected to an interexchange carrier network, the interexchange carrier network not having direct access to a national toll free database, the method comprising:
   receiving the toll free call on the interexchange carrier network via the dedicated access line;
   determining whether the toll free call is permitted over the dedicated access line;
   terminating the toll free call when the toll free call is not permitted over the dedicated access line; and
   routing the toll free call from the interexchange carrier network to a switch that can directly access the national toll free database when the toll free call is permitted over the dedicated access line.

2. The method of claim 1, further comprising mapping an identifier of the dedicated access line to a route index, and the routing further comprises routing based upon the route index.

3. The method of claim 2, in which the identifier comprises a switch identifier and trunk group number of the dedicated access line.

4. The method of claim 3, in which the mapping further comprises mapping the switch identifier and trunk group number of the dedicated access line to an NPA NXX associated with the dedicated access line and then mapping the NPA NXX associated with the dedicated access line to the route index.

5. The method of claim 1, further comprising attempting to map an identifier of the dedicated access line to a route index, and when the attempt fails, the routing further comprises routing based upon a default route index.

6. A computer readable medium storing a program for placing a toll free call via a dedicated access line connected to an interexchange carrier network, the interexchange carrier network not having direct access to a national toll free database, the medium comprising:
   a receiving code segment that receives the toll free call on the interexchange carrier network via the dedicated access line;
   an access code segment that determines whether the toll free call is permitted over the dedicated access line;
   a terminating code segment that terminates the toll free call when the toll free call is not permitted over the dedicated access line; and
   a routing code segment that routes the toll free call from the interexchange carrier network to a switch that can directly access the national toll free database when the toll free call is permitted over the dedicated access line.

7. The medium of claim 6, further comprising a mapping code segment that maps an identifier of the dedicated access line to a route index, wherein the routing code segment further comprises routing based upon the route index.

8. The medium of claim 6, further comprising a mapping code segment that attempts to map an identifier of the dedicated access line to a route index, and when the attempt fails, the routing code segment further comprises routing based upon a default route index.

9. The medium of claim 7, in which the identifier comprises a switch identifier and trunk group number of the dedicated access line.

10. The medium of claim 9, in which the mapping code segment further comprises mapping the switch identifier and trunk group number of the dedicated access line to an NPA NXX associated with the dedicated access line and then mapping the NPA NXX associated with the dedicated access line to the route index.

11. A network for placing a toll free call from a subscriber, comprising:
   a dedicated access line that receives the toll free call from the subscriber;
   an interexchange carrier switch that cannot directly access a national toll free database, the interexchange carrier switch terminating the dedicated access line; and
   a service control point that determines whether the the toll free call is permitted over the dedicated access line,
   wherein the service control point instructs the interexchange carrier switch to route the call to a switch that can access the national toll free database when the toll free call is permitted over the dedicated access line, and
   wherein the service control point instructs termination of the toll free call when the toll free call is not permitted over the dedicated access line.

12. The network of claim 11 further comprising the switch that can access the national toll free database.

13. The network of claim 11, in which the service control point maps an identifier of the dedicated access line to a route index, and provides routing instructions based upon the route index.

14. The network of claim 13, in which the identifier comprises a switch identifier and trunk group number of the dedicated access line.

15. The network of claim 14, in which the service control point maps the switch identifier and trunk group number of the dedicated access line to an NPA NXX associated with the dedicated access line and then maps the NPA NXX associated with the dedicated access line to the route index.

16. The network of claim 13, in which the service control point maps the route index to a switch identifier and trunk group number of the switch that can access the national toll free database.

17. The network of claim 11, in which the service control point attempts to map an identifier of the dedicated access line to a route index, and when the attempt fails, the service control point provides routing instructions based upon a default route index.

* * * * *